United States Patent [19]

Grundy

[11] 4,005,838

[45] Feb. 1, 1977

[54] STATION STOP AND SPEED REGULATION SYSTEM FOR TRAINS

[75] Inventor: Reed H. Grundy, Murrysville, Pa.

[73] Assignee: Westinghouse Air Brake Company, Swissvale, Pa.

[22] Filed: May 27, 1975

[21] Appl. No.: 581,369

[52] U.S. Cl. .......................... 246/182 B; 104/149; 235/150.24; 246/187 B
[51] Int. Cl.² ........................................ B61L 3/08
[58] Field of Search ................... 104/149, 1 R, 152; 235/150.2, 150.24; 246/63 C, 182 R, 182 B, 182 C, 187 R, 187 B, 187 A

[56] References Cited

UNITED STATES PATENTS

| | | | |
|---|---|---|---|
| 3,268,727 | 8/1966 | Shepard | 246/187 B |
| 3,334,224 | 8/1967 | Allen et al. | 246/187 B |
| 3,363,096 | 1/1968 | Hughson et al. | 246/187 B X |
| 3,538,325 | 11/1970 | Smith et al. | 246/187 A X |
| 3,562,515 | 2/1971 | Oster | 246/182 B |
| 3,638,575 | 2/1972 | Griner | 246/182 B X |
| 3,639,754 | 2/1972 | Kovalcik et al. | 246/182 B |

*Primary Examiner*—Stephen G. Kunin
*Attorney, Agent, or Firm*—A. G. Williamson, Jr.; R. W. McIntire, Jr.

[57] ABSTRACT

Train speed is controlled by propulsion train line (PTL) apparatus, which sets a base level of propulsion effort, and by an advance train line (ATL) apparatus, which varies the propulsion effort up or down from the existing base level in accordance with under or over speed conditions. Each full cycle of ATL operation drives the PTL apparatus to the next higher or lower base level. A propulsion error signal PE drives a comparator-clock network to generate clock pulses and an up/down signal to step the ATL register and thus the PTL encoder to bring speed within the desired range. A speed control, brake error signal SCBE controls normal train braking effort but is inhibited while propulsion control remains effective to reduce speed. When the PTL encoder counts down to the zero propulsion level, the clamp on signal SCBE is removed to activate braking to further reduce speed. Station stops are controlled by a first trigger signal a preset distance in approach to the station and two subsequent triggers at shorter distances to improve the accuracy of the stop. Each trigger signal applies a scaled value of train speed and a distance-to-go indication to an acceleration computer which continually computes the deceleration rate required to stop at the station. When a comparison of the computed deceleration rate with a desired rate results in a preset ratio, the PTL encoder is driven down to zero to reduce speed in preparation for the station stopping action.

7 Claims, 6 Drawing Figures

STATION STOP AND SPEED REGULATION SYSTEM FOR TRAINS

RELATED APPLICATIONS

Reference is made to the following copending applications, all having the same assignee and filed the same date as the present application:
1. Ser. No. 581,370, filed by R. H. Grundy for an Advance Train Line Register for a Train Speed Regulation System.
2. Ser. No. 581,224, filed by R. H. Grundy and J. J. Pierro for Propulsion Train Line Encoder for a Train Speed Regulation System.
3. Ser. No. 581,219, filed by R. H. Grundy for a Circuit Arrangement for Controlling Propulsion, Braking and Station Stopping Functions for a Rapid Transit Train.
4. Ser. No. 581,222, filed by R. H. Grundy for a Most Restrictive Digital to Analog Converter.

BACKGROUND OF THE INVENTION

My invention pertains to a station stop and speed regulation system for trains. More specifically, the invention pertains to control apparatus by which regulation of the speed of a rapid transit train can be achieved within preset limits and a station stop program can be initiated and carried to completion to halt the train at a station platform within a predetermined space limit.

The prior art technology in rapid transit train operation used a parallel-series tractive effort control system. In this arrangement, the four propulsion motors and associated control resistors on each car of a train are initially connected in series across the power source. To increase power and therefore speed, the control resistors are cut out in steps and then the motor field energy is weakened. Following this, the motors are switched to a parallel-series combination, normally with parallel pairs of motors connected in series across the power source with the same control resistors. Once again, each resistor is cut out in steps and then the motor fields are weakened, all of this increasing the speed of the train. Obviously, a reverse order of these stepping actions occurs when train speed is being decreased gradually, although the complete shut off of the propulsion motors is always possible. Originally, and still existing in some rapid transit systems, the motorman or train operator manually controls the train speed from a single position in the lead car using switching contactor apparatus. Each car of the train is controlled simultaneously to the same propulsion condition or level through train line wires running the length of the train and automatically connected from car to car when the cars are coupled together to form the train. Subsequently, a variable control of propulsion effort was developed in which variations of the propulsion level exist throughout the train. In other words, the level of propulsion effort on each car is controlled semi-independently of the level existing on other cars of the train, such as, for example, cutting off the propulsion motors of every other car to reduce the total tractive effort. However, an even more sophisticated variable control arrangement is desirable for automatic train operation. For example, it is desirable that each car individually advance to the next higher power state than that called for by the train line control, with this propulsion advance stepped car by car from the leading car to the rear car of the train. The converse of such variable operation applies when the propulsion levels are being decreased to reduce the speed of the train. This car by car stepping of propulsion level requires a separate advance train line control channel as well as an interlock to transfer each step by step cycle completion to the normal propulsion train line apparatus. At the same time, the propulsion train line requires an encoder to convert each advance train line cycle completion signal to a new train line condition. The arrangement must also include interface and/or coordination apparatus to coordinate the variable propulsion control with the train brake control. Automatic train operation also requires a station stopping control arrangement which responds to wayside actuation and interfaces the brake and station stopping with the propulsion controls by incorporating means for sensing and signaling the need for changes. In other words, velocity error detection between the desired and actual speeds of the train is necessary to provide the various interlock interface controls required to coordinate station stopping with the vehicle brake and propulsion control.

Accordingly, an object of my invention is an improved speed regulation system for trains having a variable propulsion control arrangement.

Another object of my invention is a speed regulation system for trains having an improved variable propulsion control arrangement which is coordinated with the braking control apparatus to inhibit the normal braking action while the speed is still being regulated by the propulsion apparatus.

Yet another object of the invention is a station stop and speed regulation system with an improved variable propulsion control arrangement coordinated with the braking control apparatus and station stop control means.

A further object of the invention is a station stop and speed regulation system including an advance train line apparatus and a propulsion train line encoder means to provide preselected stepped changes in the propulsion level of the train.

A yet further object of my invention is a station stop and speed regulation system for rapid transit trains providing coordinated operation between the braking, station stop, and variable propulsion control apparatus.

It is also an object of my invention to provide a propulsion control system for rapid transit trains which varies the tractive effort to either increase or decrease speed in preselected steps through the entire range of propulsion power and coordinates with brake control to inhibit braking effort while the propulsion level remains greater than zero.

Still another object of the invention is a station stop and speed regulation system for rapid transit trains including advance train line control means to step the propulsion level car by car, a propulsion train line control encoder to shift the base propulsion level, and a brake control coordination means to interface between the propulsion effort and braking effort during station stop operations and during normal operation with speed regulation.

A further object of the invention is a propulsion and brake control system for rapid transit trains including advance train line apparatus to increase or decrease the total propulsion of the train in single car steps to the next level, propulsion train line apparatus to periodically shift the base propulsion level from which the advance train line changes are made, and velocity brake error means to detect any difference between actual and desired speeds, drive the advance train line apparatus, and control braking effort to coordinate propulsion and braking applications to eliminate overlap.

A still further object of the invention is a station stop and speed regulation system for rapid transit trains responsive to wayside markers to reduce the train propulsion level in predetermined steps and activate the brake control apparatus to stop the train at a preselected position at the next station.

Other objects, features, and advantages of this invention will become apparent from the following specification and appended claims when taken in connection with the accompanying drawings.

SUMMARY OF THE INVENTION

In practicing my invention, the general philosophy or action is to control the train speed through varying the propulsion level or braking effort. With all cars of the train at the same base propulsion level and a speed increase desired, the first car is advanced by the advance train line apparatus to the next higher power state, for example, from the coast condition to the "switch" condition (power state 1), with the other cars remaining in the original or base level propulsion condition. Then the second car is advanced to the same higher propulsion level. This single car shift is repeated as necessary until the entire train is at the next higher propulsion level. At this time, a hold signal is sent throughout the train and the advance train line signal which advanced the cars to the next higher state is reduced to zero. The hold signal retains the propulsion effort until the nearly simultaneous energization of the propulsion train line for this next higher level occurs. After this has been accomplished, the train is free to once again advance, car by car, to the next higher power state. A decrease in tractive effort is a retrogression of the same chain of events. The advance train line channel and encoder apparatus is thus a scheme whereby an analog voltage is passed down the train to each successive car. Each car operates an advance relay when the voltage input is higher than a preselected level. Each car then retransmits the received voltage minus a preset voltage to the next successive car. For specific example, in one system the advance relay in each car is energized and acts only if the input voltage is higher than 6 volts and each car subtracts 12 volts before transmitting the voltage to the next car. Thus, as the voltage transmitted from the first car is stepped successfully to higher values, the necessary operating voltage is transmitted to successive cars to actuate them in a sequential manner towards the rear of the train.

The advance train line arrangement is stepped by clock pulses which are developed in accordance with a velocity or propulsion error signal. Signals representing the desired speed and the actual speed measurement are compared to produce a single analog error signal whose sign designates the over or under speed condition and thus determines whether power should be decreased or increased, respectively. This analog signal is converted into a digital signal to provide the clock pulses for driving the advance train line (ATL) apparatus, the frequency being determined by the magnitude of the error signal as converted into digital form. When the ATL apparatus has completed a cycle, that is, all cars have been shifted to the next higher or lower level as selected, the apparatus generates and transmits a clock pulse to the propulsion train line (PTL) apparatus. Also, when all of the cars have been advanced or retarded to the next adjacent power condition, a hold wire is energized which freezes the train line relays to the last condition called for by the ATL apparatus until the PTL apparatus has responded to the clock pulse. At this time, the ATL apparatus is returned to the opposite registry condition to prepare for further variation of the propulsion level.

The PTL apparatus establishes an existing base propulsion level of the tractive effort of the train, that is, all cars at the same propulsion state. The clock pulse from the ATL apparatus actuates the PTL encoder up or down, as required, one full state of propulsion level. This operation of the PTL apparatus increases or decreases the base propulsion level to the next higher or lower level by energizing the train line relay corresponding to the base level of propulsion now established and also the train line relays for all lower levels. The speed error signal also acts on the brake control apparatus but a clamping element inhibits its application, so that the brakes are held released at any time that the train line arrangement is established at a base propulsion level above zero. This is done in order to inhibit braking while speed regulation may be accomplished by a variation in the propulsion level only.

A station stop control arrangement is incorporated into the system and interfaced for coordination with the propulsion and brake control arrangements. Station stop apparatus is responsive to each of three trigger coils accurately located, with respect to a station platform, along the approach track. It is then the function of the station stop apparatus to transform these trigger signals and the speed measuring tachometer pulses into an accurate positioning of the train at the platform with a comfortable deceleration from operating speed to the station stop. In considering a system for stopping a train, the accuracy of the stop divided by the distance over which the stop must be made determines the accuracy to which calculations must be made. When this is considered along with such criteria as a square root involved in the calculations and a variable input voltage, it is apparent that a one-trigger stop is not feasible. In order to maintain accuracy, it is therefore necessary to update the system one or two times at additional trigger coil locations during the station stop program so that the accumulated error may be reset to zero. During resets, the equipment again restarts its calculations with regard to stopping at a new and higher resolution which also allows full use of the voltage swing limits within the source. For this reason, the station stop system employs a rescaling technique which is accomplished at each of the three trigger points. As the trigger impulses are received, a rescale element rescales the calculations by increasing the apparent tachometer frequency and by altering the gain of a variable amplifier which is used to scale the actual velocity signal. The tach frequency, after division, is counted and fed to a digital to analog converter which converts the tach pulses into a voltage proportional to the distance from the stopping point.

The rescaled actual velocity signal and the distance signal are then fed into an acceleration computer which calculates the product of the velocity squared divided by twice the distance. This product represents the deceleration rate necessary in order to stop at the station platform. As the train continues towards the station without any deceleration, this product becomes larger since a higher deceleration rate is necessary as the application of the brakes is delayed. When this calculated deceleration product closely approaches a selected desired deceleration rate, the ATL and PTL apparatus is driven to reduce the train propulsion level to zero. When the required deceleration equals the desired deceleration rate, a comparator is actuated which alters the flow of information to a brake error amplifier which then responds to the difference between the measured actual acceleration and the calculated deceleration. If the deceleration calculated to stop at the station begins to exceed the actual deceleration, the difference will increase which, multiplied by the gain of an amplifier, will cause a signal to the control line to apply the brakes in order to rebalance the actual deceleration with the calculated value.

It will be apparent that this arrangement is then a "rate wild system" in that the deceleration rate which the train maintains during a station stop is not fixed but is free to vary in accordance with the conditions. For example, when a wayside trigger signal is received, there is always a possibility that the station stop profile was in error. The reception of this signal will cause a reset of the distance circuit and rescaling of the velocity such that the calculated deceleration signal will take a step function, either plus or minus in accordance with the direction of the error, which will then be fed into the brake system also by a step function. However, due to delay, the brake system will not begin to react immediately, so that the calculated deceleration will tend to increase. Once the brakes are applied, then the actual deceleration will begin to balance the calculated value which, due to the time delay, will cause a reduction in the calculated value. Thus, the final deceleration rate that the train uses for the station stop will lie somewhere between the original value of the calculated deceleration and the value which is attained at the rescale point. It can be seen then that the system converges the actual deceleration and calculated deceleration signals to a value midway between the two every time a system disturbance causes a separation.

BRIEF DESCRIPTION OF THE DRAWINGS

I shall now describe in specific detail a preferred arrangement of a station stop and speed regulation system embodying my invention, as illustrated in the accompanying drawings, in which.

Figure 1:
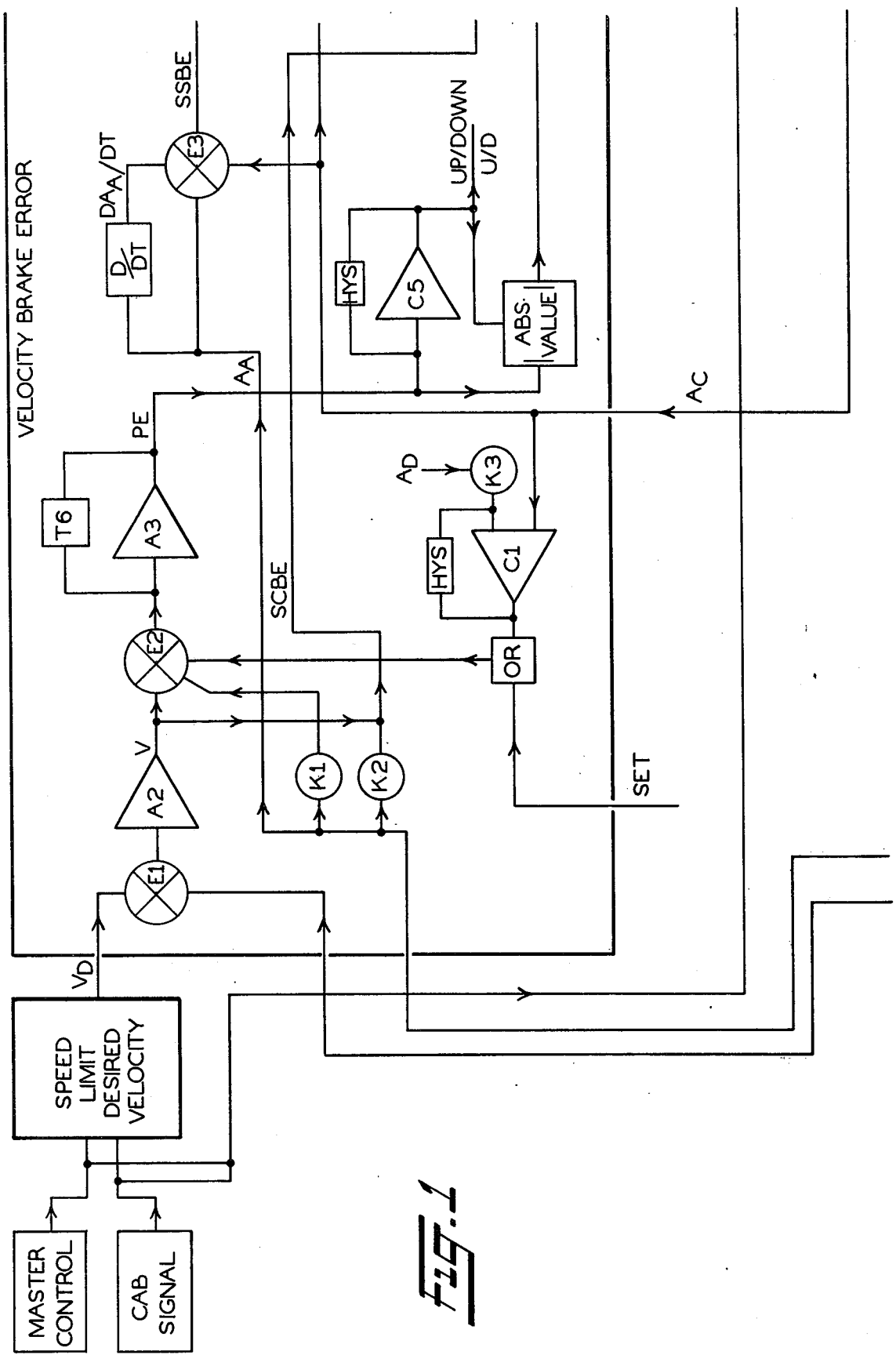
FIGS. 1, 2, 3, 4, and 5, when arranged in accordance with the chart of FIG. 6, illustrate in schematic form an arrangement of apparatus embodying my invention and providing a station stop and speed regulation system for trains.

The system is illustrated in the drawings principally by a logic diagram in which conventional logic symbols are used where appropriate. Otherwise, labeled blocks are used to designate the required apparatus. The specific circuits are not critical known as any logic elements and circuitry to perform the designated function may be utilized. Normally, solid state circuit elements, preferably of the integrated circuit type, will be used, but the apparatus is not limited to this arrangement or style of circuit elements.

DETAILED DESCRIPTION OF THE ILLUSTRATED EMBODIMENT

Figure 3:
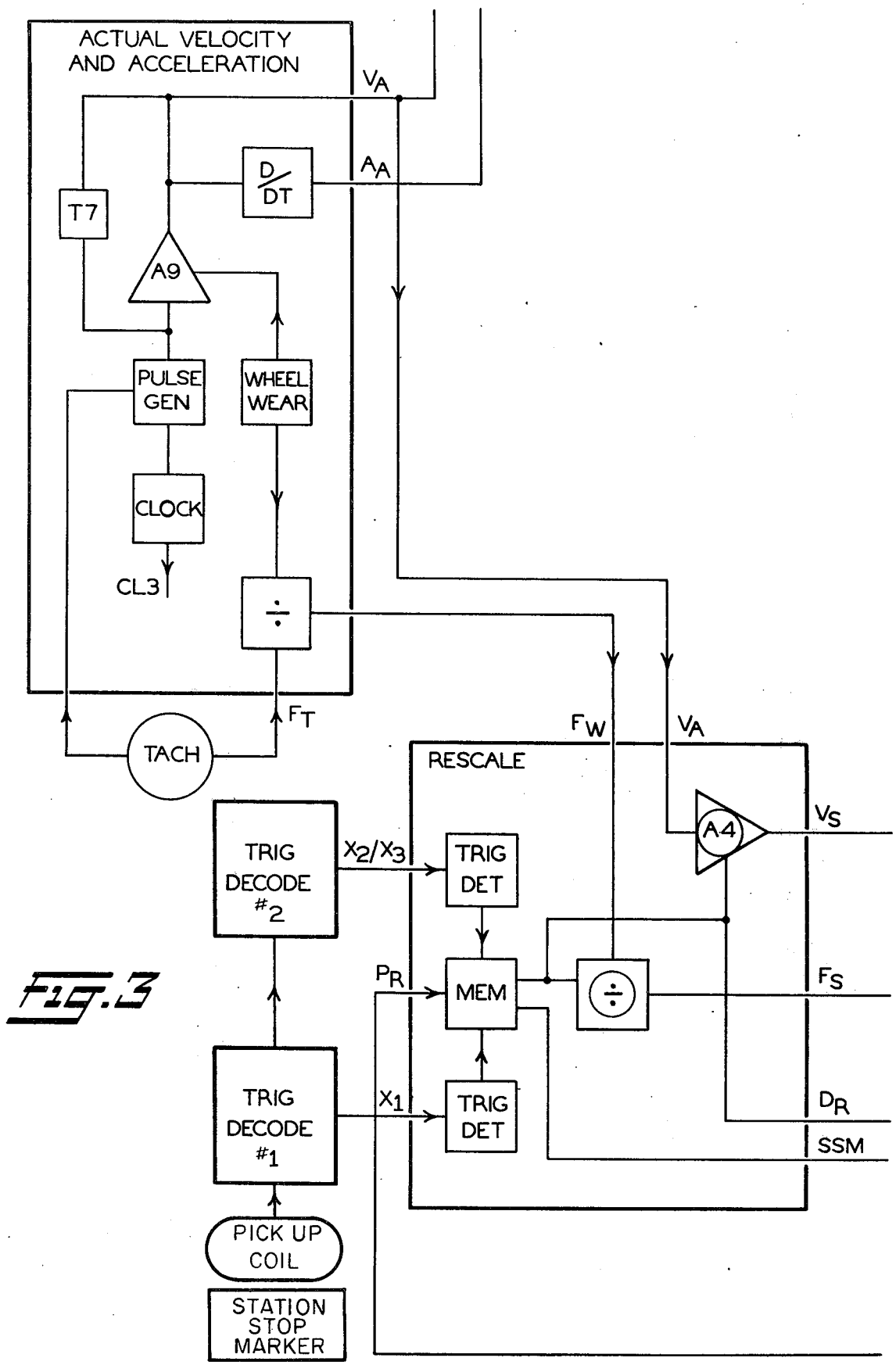
Figure 6:
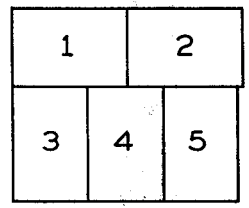
FIG. 6 is a chart diagram illustrating the manner of arranging the other drawing figures to complete the illustration of the station stop and speed regulation system.

It is convenient to begin this description with the speed input commands shown at the left of FIG. 1. These command signals are supplied by either a master control which is under the direction or supervision of the train operator or attendant or by a cab signal system which develops the speed signal in accordance with the traffic conditions ahead of the train. These two digital signals are fed into a speed limit, desired velocity element which is illustrated by a conventional block so designated. Briefly, this speed limit, desired velocity unit selects and converts the lower of the two input speed signals to an analog voltage output designated as the desired speed $V_D$. Any circuit arrangement which will accomplish this function in a safe and reliable manner may be used and the system herein disclosed is not limited to any specific circuit apparatus. One form of circuitry which may be used is disclosed in my above-cited copending application Ser. No. 581,222. This desired velocity signal $V_D$ is a positive voltage and is fed to the E1 summing junction input of amplifier A2 where it is compared with the analog voltage proportional to the actual train velocity $V_A$. The signal $V_A$ is derived by a train speed measuring means illustrated by an axle-driven tachometer (TACH) and the block designated as the actual velocity and acceleration component (FIG. 3). The tachometer pulses are supplied to a pulse generator in which, by means of digital logic circuitry, produces a signal by timing-on the first clock pulse CL3 after the reception of a tach pulse and timing-off after the reception of the next clock pulse CL3. This produces a constant width pulse, one clock period wide, which is used to switch the variable tachometer voltage through amplifier A9 where it is averaged, with modification by the wheel wear switch, to give a smooth direct current signal proportional to speed $V_A$. The signal $V_A$ is also differentiated in the illustrated differentiating circuit (D/DT) to produce a time differential of signal $V_A$ which is the actual acceleration of the train, designated as signal $A_A$. These two signals produced by the actual velocity and acceleration unit are needed for both the station stop and the speed regulation arrangements.

Figure 2:
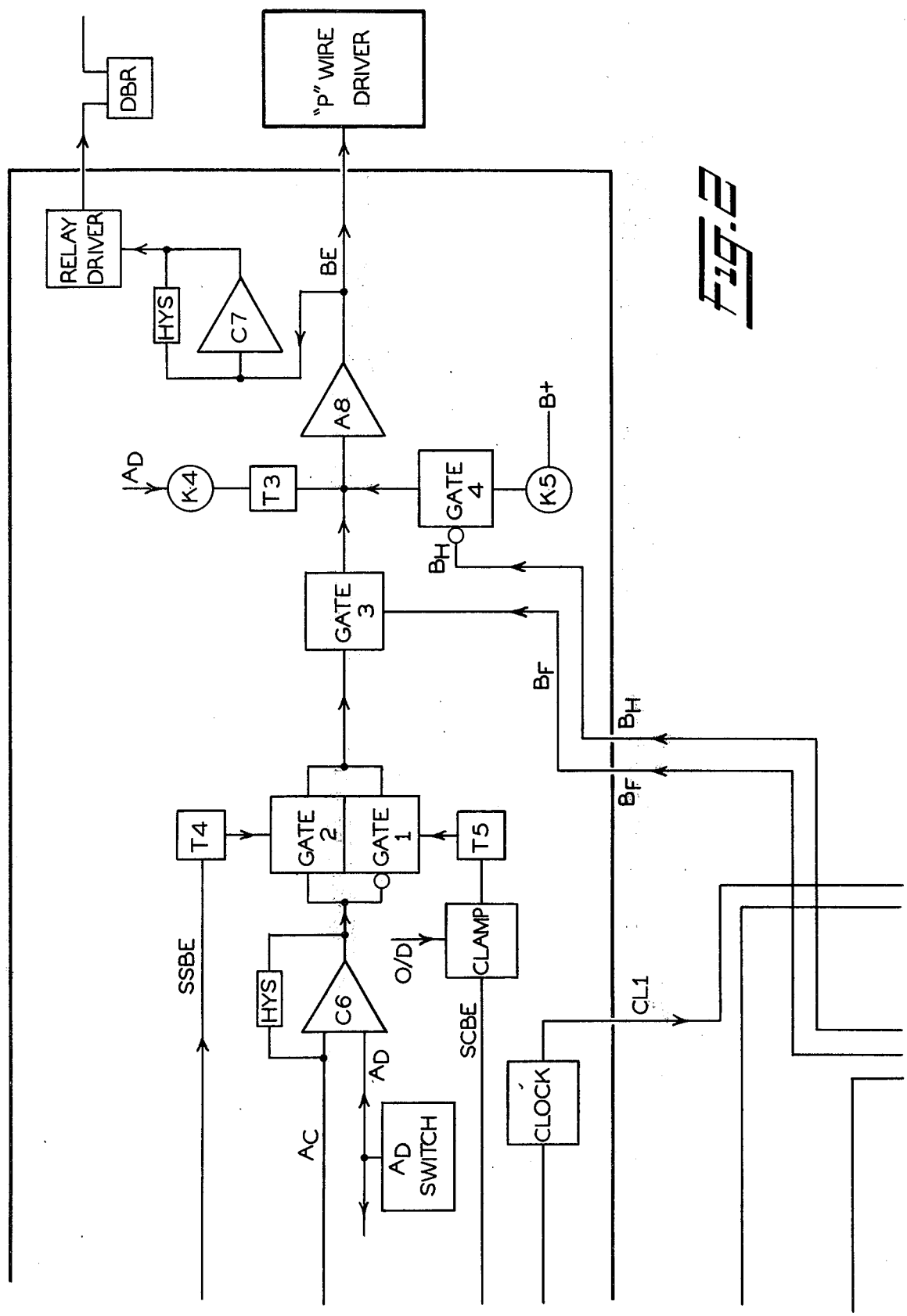

The velocity and brake error component, shown in FIGS. 1 and 2, is the same as the apparatus disclosed and claimed in my cited copending application Ser. No. 581,219. However, the showing herein is complete and the apparatus is described in full detail to provide a complete understanding of the full system for train station stop and speed control embodying my invention. After the two velocity signals $V_D$ and $V_A$ are summed and multiplied by the amplifier A2, the result is a velocity error signal V which is scaled to velocity error in miles per hour. For example, in one specific installation, signal V is scaled to 0.1 volt per mph error. Since the propulsion and brake systems have different transmission delays and time constants, it is necessary to split signal V into two paths. Also, for purposes of control, it is advisable to add to this velocity signal selected amounts of acceleration feedback using signal $A_A$. Since the brake system is different from the propulsion system, two different ratios $A_A/V_A$ are necessary for these two loops. Thus, the signal $A_A$ is fed through two different multiplying factors K1 and K2, each associated with a different loop circuit. The signal $A_A$ multiplied by factor K1 is used with the propulsion loop and is summed with the velocity error signal V by summing junction E2. The sum is then multiplied by amplifier A3 with its associated time constant T6. Signal $A_4$ multiplied by factor K2 is joined with signal V in another branch to produce a speed control brake error signal SCBE which will be further discussed later.

The output of amplifier A3 is a propulsion error signal PE which is then fed into a comparator C5 which has a small amount of hysteresis, as designated by the block designated HYS. The function of comparator C5 is to determine the sign of the error. For example, if the error is positive, then the train is going too fast and a reduction in tractive effort is needed. Since signal PE ultimately becomes a clock frequency which is fed to a register, it is important whether the register counts up or down. This is a function of the sign of the propulsion error. Thus, the output of comparator C5 is used to drive an UP/DOWN line, elsewhere indicated by the reference U/D, which is used by the digital logic. In another function, comparator C5 forms part of the circuitry to generate an absolute value which is necessary because the clock, which is in this case an analog to digital (A/D) converter, does not respond to bidirectional signals. The output of the absolute value circuit, which is illustrated by the conventional block designated |ABS VALUE|, is a voltage which is always negative and proportional to the propulsion error. The clock input is fed from a resistor divider network which generates a nonlinearity in the clock output frequency with regard to the input error. This nonlinearity is designed to produce an increase in clock rate as the error magnitude increases from the set point. The clock, also illustrated by a conventional block so designated, also possesses a dead band. If the error signal PE is within this dead band, the clock will not operate at all. The output of the clock is normally a series of periodic pulses, at the selected frequency, designated by the reference CL1.

Figure 5:
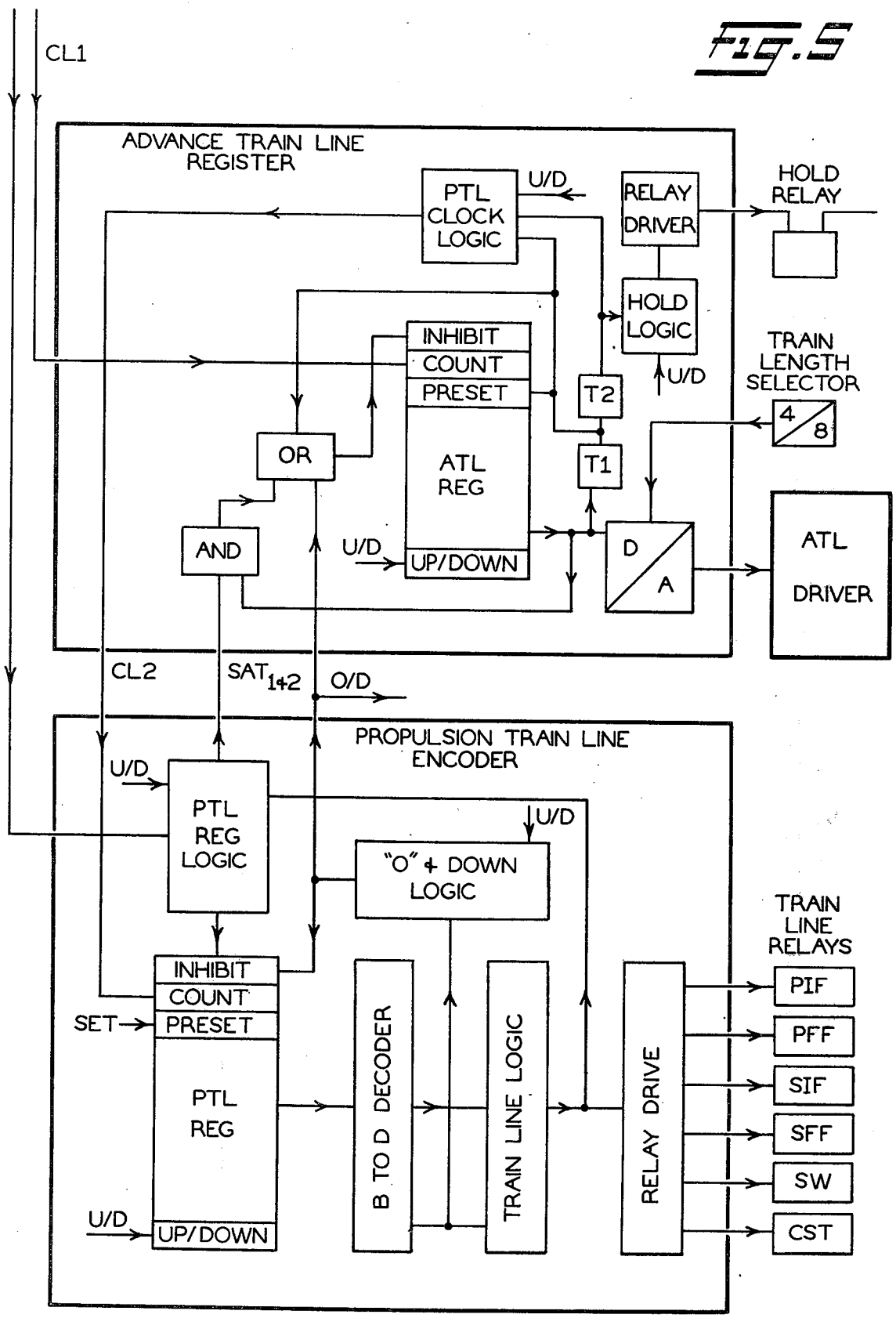

The output pulses CL1 and the signal on the U/D line are then fed, in the normal loop progression, to the advance train line (ATL) register (FIG. 5). This ATL register's function is to advance or retard the propulsion level of the cars one by one in a vernier manner and thus control the train speed by small additions or substractions of the tractive effort. This ATL register and associated apparatus is shown by conventional block diagram, including some logic circuitry, since any one of various circuit arrangements which will provide the hereinafter described operation may be used. One specific form of ATL apparatus which is used in one installation is shown in my previously mentioned copending application Ser. No. 581,370. However, while the showing here is somewhat less detailed, the block diagram and following description is sufficient for a full understanding of the ATL register operation in the complete system disclosed herein. The CL1 pulses are fed directly into the ATL register clock or count input element while the U/D signal goes into that portion of the register which controls whether the count proceeds up or down. The ATL register is free to count up or down until it reaches its maximum condition in either direction. In one specific installation, the maximum count is four while obviously the minimum count is zero.

If the ATL register, in counting up, reaches the maximum count state (the fourth clock pulse), then a time period T1 is initiated and begins to run. During the timing period T1, the ATL register is inhibited from counting further. This inhibition is necessary since the ultimate receivers for this advance train line information are a set of relays which require a settling time equal to period T1. Once the relays have settled or assumed the directed condition, the counter portion of the register will be automatically preset to zero (0) and timing period T2 is started. When period T2 is completed, a clock pulse CL2 is sent to the PTL register element of the propulsion train line encoder shown in the lower part of FIG. 5. This advances the PTL register one count. Thus, in the up counting condition, the advancement of the PTL register is delayed for the period T2. Also during an up count, the HOLD LOGIC element of the ATL apparatus is arranged such that the hold relay is maintained in the energized condition continuously so that the achieved propulsion level of the advance train line is always held. When counting down, the ATL register eventually reaches a zero count. When it is in the zero condition and the U/D line is in the down counting state, the period T1 is initiated and the ATL register is inhibited for this length of time. When period T1 ceases, the period T2 is started and a pulse CL2 generated. Simultaneously, the HOLD LOGIC element energizes the HOLD relay and the ATL register is preset back to its highest or fourth counting state. In either the up or down counting condition, the ATL register or counter is not inhibited and free to record counts during period T2.

The output count of the ATL register in digital form is fed into a digital to analog converter (D/A) which converts the coded binary digits into an analog current that is used by the ATL driver or encoder for driving the advance train line channel. The ATL register is a five state (including 0) register. Therefore, in order to run an eight-car train, the D/A converter is controlled by the train length selector switch 4/8 in such a manner that the current steps provided into the advance train line are approximately twice as large in the eight-car mode. This causes the advance train line driver to advance in two car steps as opposed to single car steps for a four-car train.

The propulsion train line encoder comprises an up/-down register or counter element (PTL REG) plus associated logic and decoding function elements. The output of the PTL CLOCK LOGIC element of the advance train line component, in the form of the clock pulses CL2, is fed to the propulsion train line register (PTL REG) which counts up or down as a function of the input U/D. Since the output of the PTL REG element is in binary coded decimal form, it is necessary to convert this into the decimal system. This is accomplished by the B to D DECODER element. This decoder circuit decodes the binary coded decimal into a high level signal for each one of the ten numbers whenever that number appears in the binary coded decimal output. That is, when the first two binary output terminals of the PTL register are at a high level, which indicates the numeral three, the decoder element will have a high output at its terminal three only. This single output is insufficient since, because of propulsion requirements, it is necessary to maintain all lower state output terminals also energized. For example, when terminal output 3 is active, the one and two outputs must also be energized. Thus additional logic is necessary to ensure that the lower states remain energized. This feature is accomplished by the Train Line Logic element whose output then feeds the relay driver element which energizes the required train line relays. The relay symbols designate the various propulsion conditions in accordance with the following chart:

PIF — Parallel Intermediate Field
PFF — Parallel Full Field
SIF — Series Intermediate Field
SFF — Series Full Field
SW — Switch (Initial Traction State)
CST — Coast (Power Off)

In most modern rapid transit systems, particularly where automatic train operation with station stop and speed regulation controls are in use, the operating specification normally sets forth conditions in which the propulsion train line register shall not be advanced beyond various tabulated predetermined propulsion efforts selected as functions of the various allowed velocity ranges. In other words, when the allowed speed limit in force is less than the maximum speed, the propulsion level must be inhibited from advancing beyond a preselected one of its conditions. For example, the specification may direct that, if the desired speed that is requested is 15 mph, the train shall not be permitted to advance to a propulsion condition beyond the series intermediate field state. Since the advance train line apparatus can advance the train one propulsion state higher than the base level being called for by the propulsion train line encoder, the propulsion train line register therefore must be limited to one less state than that called for by the specification. In this example, this would be the series full field tractive effort condition. When the PTL register reaches the series full field state under the condition of 15 mph desired velocity, the propulsion train line register logic element, designated by the block designated PTL REG LOGIC, recognizes this and inhibits the propulsion train line register (PTL REG) from further counting up. At the same time, the PTL REG LOGIC sends a saturation signal over either the $SAT_1$ or $SAT_2$ line (here shown as a single flow line) to the advance train line apparatus. The advance train line component has a series of logic elements, illustrated by the AND and OR blocks, which, when a saturation signal is received, determine that the advance train line register has reached its highest state and then inhibit it from further progression during this condition. This represents a saturated condition and provides sufficient propulsion to accelerate the train to the desired velocity on whatever grades exist in the track system. The system, however, is not locked in this saturation mode for, when the set speed is achieved, the up/down line U/D changes to a down condition signal which then removes the inhibit from both registers, permitting a decrease in tractive effort, if desired. The PTL register logic also sends a saturation signal to the ATL register when the PTL register has reached its highest state, that is, a full count, the highest propulsion level. This is necessary to keep the advance train line encoder from cycling if continuous pulses CL1 are received when an error or fault condition exists.

When a decrease in tractive effort is called for, the line U/D changes to a down condition signal and the registers proceed to retrogress down to zero level. If the speed reduction is such that braking is required, the PTL register will eventually reach the zero condition, in which the coast train line is deenergized and the CST relay drops out. When this occurs, the advance train line signals are prevented from picking up any relay to cause a train to respond to any propulsion command. For this reason, the at-rest state of the system is with the advance train line register fully advanced to its highest condition and the PTL register at its lowest or zero state. When the PTL register is in the zero condition and a down counting state exists on line U/D, a signal is generated by the "0" & DOWN LOGIC element of the PTL encoder which is supplied over the 0 & DOWN line O/D to other parts of the system. It may be noted that, in the one specific installation previously mentioned, the PTL apparatus incorporated into the system is that disclosed in the cited Grundy and Pierro copending application Ser. No. 281,224.

The O/D signal is used, for example, to inhibit cycling by the ATL register so that the advance train line relays are not cycled during the braking portion of the speed regulation. The O/D signal is also supplied to the velocity brake error component where it is used to remove a clamp, illustrated by the conventional block, on the speed control brake error signal SCBE. Once this clamp is removed, the velocity error signal as derived by the sum of the outputs of multiplier K2 and amplifier A2 is allowed to flow through timer T5 and gates 1 and 3 to amplifier A8. The output of amplifier A8 is designated as the brake error signal BE which is normally a slightly negative voltage. However, when this signal goes to a positive voltage upon the removal of the clamp, thus indicating a request for braking effort, comparator C7 deenergizes the braking relay DBR through the illustrated relay driver element. Signal BE is also fed to the "P" train line wire driver which begins to apply brakes by lowering the current in the train line P from its normal release value. This O/D clamp is provided because, whenever a decrease in train speed is obtainable through a reduction in propulsion only, some means is necessary to inhibit the brakes from being applied, as would be the case since a brake error voltage SCBE exists under such conditions.

Considering now the station stopping procedures, it has been previously described that in order to initiate a station stop operation, it is necessary to receive a trigger signal from wayside actuating means over the pickup coil, as shown in the lower left of FIG. 3. This wayside station stop maker means or device, illustrated by a conventional block, is located a predetermined distance in approach to the station platform. Several types of such triggering arrangements are known and any one may be used. For example, the wayside device may be a permanent magnet which induces a signal into a train carried receiver coil as it passes over the marker. In a modification, the initial marker may be an electromagnet energized or not energized as a particular train is to stop or not stop, respectively, at the designated station. Another arrangement provides a single, fixed wayside coil which completes the coupling between two train carried coils to generate a signal which initiates the train stop procedure. Whatever the marking arrangement used, the received trigger signal is fed through a decoder element to the trigger detedtion circuit in the RESCALE component which then feeds a series of logic elements designated as a memory unit shown by a conventional block MEM. It has also been previously mentioned that in order to reduce the effect of errors in the operation and to increase the accuracy of the station stop, more than one trigger signal, that is, more than one wayside actuating device, must be used. In one specific installation, three such wayside devices are utilized, each a different preselected distance in approach to the station. Under this operation, the signal produced in the pick-up coil from the first wayside device, after decoding in the illustrated first decode element, provides a signal $X_1$ into the corresponding trigger detection element and thence into the memory unit. The trigger signal developed in the pick-up coil upon passage of the second and third wayside devices is passed to the No. 2 decoding element and thence provides, respectively, the signals $X_2$ and $X_3$ which are passed through another trigger detection element into the memory unit.

Figure 4:
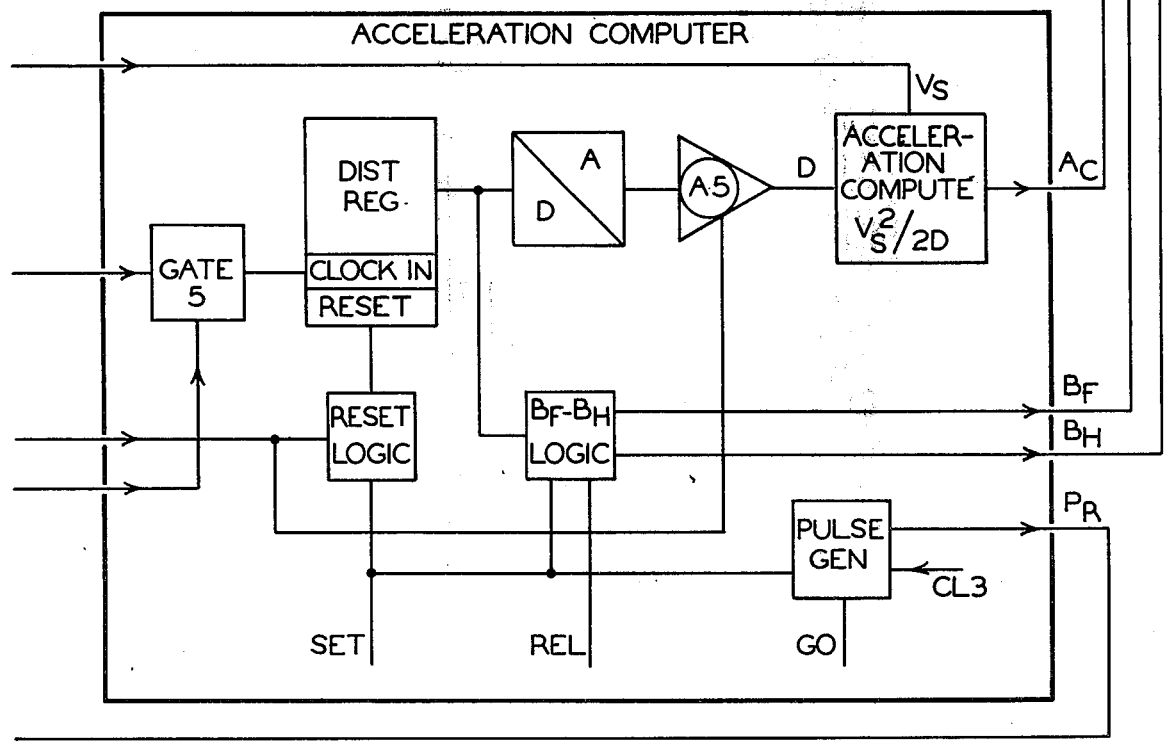

The resulting output from the memory unit upon registry of the first trigger signal causes the station stop mode line SSM to apply a high level signal to the acceleration computer component (FIG. 4) indicating that it is now in the station stop mode. This high level signal is actually applied to a gate element 5 to be discussed shortly. There are two other signals which are used to effect a station stop. These are the tachometer input frequency, corrected for wheel wear and designated as the signal $F_W$, and the actual velocity signal $V_A$, from the speed measuring means, which is also corrected for wheel wear. Since the tachometer generates a pulse $F_T$ for each revolution of the axle, each pulse therefore represents a unit of distance-traveled, i.e., the circumference of the wheels. When corrected for wheel wear, the totalized pulses are a measure of total distance traveled, e.g., beyond the wayside trigger device. These input signals are altered in frequency to different degrees and amplitude, respectively, depending upon which of the three trigger signals has been received. Signal $V_A$ is applied to the input of a variable gain amplifier A4, while the frequency signal $F_W$ is applied to one input of a frequency divider element. If the first trigger signal has just been received, the memory output sets the gain of amplifier A4 to its lowest value, while the frequency divider, which divides signal $F_W$ into a scaled signal $F_S$, is set at its highest divisor value. At subsequent triggers, amplifier A4 is increased in gain while the frequency division is decreased so that, at the last or third trigger, signal $F_S$ is equal to signal $F_W$. Signal $F_S$ is transmitted through a gate 5, which is enabled (the circuit completed) by the high level signal on line SSM, to the distance register element (block DIST REG) which is a totalizer of the scaled tachometer pulses. The output of the distance register is then fed to a digital to analog converter which converts the totalized tachometer signals into an analog signal of distance, translated to actually be distance-to-go to the station stop. This distance signal is set at a preselected voltage level and then decreases linearly towards zero as the train approaches the stopping point. From the rescale component, over the distance reset line $D_R$, a signal is supplied to reset the distance circuit upon reception of each trigger signal including the first signal.

Due to the fact that the final 3 feet, for example, of the station stop operation are made open loop, it is necessary to multiply the distance signal by a difference gain after reception of the third trigger signal. This is the reason for the variable gain amplifier A5 inserted in the output between the D/A converter and the Acceleration Compute element shown at the right of the Acceleration Computer block. The gain of amplifier A5 is controlled over the distance reset line $D_R$ from the rescale component in accordance with the trigger signal recorded in the memory unit. The distance-to-go signal D, as output from amplifier A5, is finally divided into the square of the scaled velocity signal $V_S$, in accordance with the ratio shown within the acceleration compute element. The result is an acceleration signal, actually the instantaneous deceleration rate $A_C$ necessary to stop the train at the station from its present position and speed.

When the train is nearing the station platform and is proceeding at a very low rate, for example, less than 3 mph, the filter circuits in the velocity and acceleration components have difficulty filtering the analog signals which causes rather large disturbances in the deceleration signal $A_C$. For this reason, at approximately 6 feet from the stopping point, the entire system is forced into an open loop operational mode by a high level signal on the brake flare line $B_F$. This brake flare signal is actuated by the distance circuit when it reaches what appears to be 3 feet but in reality is 6 feet from the station stopping point. Following this brake flare signal, the brakes will be governed in an open loop manner which will be described shortly. When the doors are opened at the platform, the brake flare signal $B_F$ remains at high level and the brake holding signal $B_H$ also goes to a high level. This latter signal is used to actuate a holding brake application for a purpose to be described shortly. If all of these foregoing actions have proceeded in the proper order, then when the train doors are closed at the completion of the station stop and the ATO starting device is actuated, the application of this GO signal to the pulse generator element shown in the lower right of the Acceleration Computer block actuates a program reset signal $P_R$ to a high level which resets the memory unit, taking the station stop system out of the station stop mode and retains it in a clamped state waiting for the next wayside trigger input.

Since a station stop command is very likely to occur during the time that a train is being regulated by the propulsion control system, some arrangement for a smooth transition from propulsion to braking must be provided. This is achieved by feeding the deceleration signal $A_C$ into a comparator element C1 within the Velocity Brake Error component where it is compared with approximately 90% of the desired acceleration/deceleration signal $A_D$. This latter signal is provided from an element designated as the $A_D$ Switch, shown near the center of the Velocity Brake Error block, and is preset in accordance with the desired operating conditions of the transit system to provide comfortable acceleration and deceleration for the passengers. Whenever the signal $A_C$ reaches 90% of the value of signal $A_D$, the output of comparator C1 is applied, through an OR gate to summing circuit E2 and thence to amplifier A3, overriding all other inputs to drive down the propulsion effort into a coast condition. It is important to note that the output of comparator C1 only affects the propulsion portion of the speed regulation arrangement and not the braking portion. Thus a true coast condition can be maintained until signal $A_C$ approaches signal $A_D$, causing initiation of the stopping action itself.

Signals $A_C$ and $A_D$ are both also applied to a comparator element C6. When these two signals are equal, the output of comparator C6 inhibits or interrupts the circuit through gate 1 and enables or completes the circuit through gate 2. Thus, the signal that is now fed to amplifier A8, through time constant T4 and gates 2 and 3, is the difference between signals $A_A$ and $A_C$ as produced in the summing junction E3, i.e., the Station Stop Brake Error signal SSBE. As previously described, if the calculated deceleration exceeds the actual deceleration, then a positive error exists which will cause amplifier A8 to increase its output which is the braking error signal BE. Also as previously described, this increases the amount of braking effort by the P line driver and, through comparator C7, causes relay DBR to release. When the train reaches the 6-feet-to-go mark, the brake flare signal $B_F$ goes to a high level which inhibits gate 3. The interruption of this gate disconnects all previously described signals from amplifier A8, which is a high input impedance amplifier. The only input now to amplifier A8 is that determined by the multiplier or attenuator K4 and the desired acceleration signal $A_D$. This input to amplifier A8 slowly rises to a value necessary for the smooth slow down of the train, which rise is governed by the time constant T3. The impedance under these conditions is sufficiently high that normally during propulsion or station stopping operations, it is overridden by the signal generated in the usual propulsion or station stopping circuitry and applied through gate 3. When the train doors are open, the brake holding signal BH goes to a high level which causes gate 4 to clamp the input of amplifier A8 to a level (B+ through multiplier K5) that is necessary to maintain a preselected brake service pressure, for example, a half service pressure.

While the train is sitting at the station, the propulsion or speed control circuitry will normally be trying to satisfy the input speed command. In order to prevent this, a signal actuated by the train operator is applied to the SET line which causes the propulsion circuitry to maintain a zero and down state. This is illustrated in the propulsion train line encoder component by the SET input to the PRESET portion of the PTL register. When the start command is actuated, the GO signal causes the SET signal to disappear, thus resetting the station stop circuitry and permitting the propulsion circuitry to advance to the desired speed.

The station stop and speed regulation system of my invention thus provides an interfaced and coordinated control arrangement for a rapid transit train to regulate its propulsion and braking efforts with an incorporated station stop program. Speed regulation is achieved in a finely variable manner through the use of an advance train line control arrangement which steps the propulsion effort up or down, car by car, to either increase or decrease train speed, from a base propulsion level established by the usual propulsion train line control. The propulsion train line encoder apparatus responds to the completion of each cycle of ATL operation to shift to a new base propulsion level with the ATL apparatus then reset to continue its variable control. Braking effort is inhibited while any propulsion effort exists in order to allow speed regulation by propulsion control only, as possible. The braking effort is initiated when the PTL encoder reaches its lowest level while in a count-down condition, that is, less than the coasting speed. The station stop program is initiated by the reception of a wayside trigger signal which designates a preselected stopping distance. The trigger signal initiates the stopping program which calculates the deceleration rate required to achieve an accurate station stop. This program is rescaled to increase its accuracy at successive trigger locations in approach to the same station. The program is also coordinated with the speed regulation apparatus to slow the train by reduced propulsion effort until the required deceleration rate matches the level at which braking is required. The complete system of my invention thus functions in an efficient manner to achieve the desired results with the minimum apparatus to provide an economical arrangement.

While I have herein shown and described but a single specific illustration of a station stop and speed regulation system for trains embodying my invention, it is to be understood that various changes and modifications may be made therein within the scope of the appended claims without departing from the spirit and scope of my invention.

Having described the invention, what I claim as new and desire to secure by Letters Patent, is:

1. A station stop and speed regulation system for a train, each car of which is equipped with braking control means interconnected for common operation of brakes throughout the train, and with variable propulsion control means capable of providing a plurality of propulsion effort conditions, comprising in combination,
   a. a desired velocity source for supplying a desired speed signal,
   b. a train speed measuring means coupled for measuring velocity of the train and for generating separate signals representing actual train speed and actual train acceleration,
      i. said measuring means also supplying pulses, each representing a unit of distance traveled by that train,
   c. a speed and brake regulating means coupled for receiving said desired speed, actual speed, and actual acceleration signals, and responsive to the difference between said desired and actual speed signals for generating a series of first clock pulses in accordance with the magnitude of said difference and an error direction signal having a first or a second condition as said actual speed is less than or more than said desired speed, respectively,
      i. said speed and brake regulating means further responsive to said difference for generating a brake error signal to jointly actuate said braking control means, said brake error signal normally inhibited from execution while a propulsion effort exists,
   d. an advance train line register means connected for receiving said series of first clock pulses and said direction signal and responsive thereto for varying the propulsion level of the train by preselected steps including a preselected number of cars less than the total cars in the train, one step for each clock pulse, increasing or decreasing from the train base propulsion level as said direction signal is in said first or second condition, respectively,
      i. said advance train line register means responsive to the completion of each full train cycle of propulsion variation for generating a second clock pulse,
   e. a propulsion train line encoder means coupled for receiving second clock pulses and said direction signal and responsive thereto for establishing a new base propulsion level for the train upon reception of each second clock pulse, increased or decreased from the former base level in accordance with the first or second condition of said direction signal,
      i. said propulsion train line encoder means connected, when in its zero count condition during a count-down action, for removing the inhibiting clamp on said braking error signal to actuate a train braking action and for resetting said advance train line register means,
   f. a trigger detection means responsive to passage by a station stop actuating device, positioned along the track wayside a predetermined distance in approach to a station stop location, for registering a station stop trigger signal,
g. an acceleration computer means, connected to said trigger detection means and to said speed measuring means, responsive to said trigger signal, said distance traveled pulses, and actual train speed signal for computing a signal representing the deceleration rate required to stop that train at said station stop location, and further coupled to supply the required deceleration signal to said speed and brake regulating means,
h. a source of a desired acceleration/deceleration rate signal, coupled to supply that signal to said speed and brake regulating means,
i. said speed and brake regulating means responsive to said desired deceleration signal and said required deceleration signal in a preset ratio for driving said propulsion train line encoder means to the lowest propulsion level for that train,
j. said speed and brake regulating means also responsive to said desired and required deceleration signals when equal for interrupting the normal speed control of the train braking control means and for actuating a train braking action at said desired deceleration rate until that train has stopped at said station stop location.

2. A station stop and speed regulation system as defined in claim 1, in which said trigger detection means is responsive to passage by subsequent wayside station stop devices, each positioned a different lesser distance in approach to said station stop location, for resetting said acceleration computer means, rescaling said actual train speed signal and the distance signal, and reactuating the computing of said required deceleration signal using the rescaled values.

3. A station stop and speed regulation system as defined in claim 2 in which three successive wayside station stop actuating devices are used to control the station stop operation with increased accuracy.

4. A speed regulation system for a rapid transit train, each car of which is equipped with variable propulsion control means providing a plurality of propulsion effort conditions, comprising in combination,
a. a desired velocity source responsive to one or more speed limit detectors for supplying a single desired speed signal,
b. a train speed measuring means coupled for producing a signal representing actual train speed and further operable for producing another signal representative of train acceleration,
c. a velocity brake error means coupled for receiving said desired and actual train speed signals and said train acceleration signal, and responsive thereto for producing a first series of clock pulses having a frequency determined by the magnitude of any difference between the actual and desired train speeds, and a direction signal having a first or a second condition as said actual speed is less than or more than said desired speed, respectively,
d. advance train line register apparatus connected for receiving said first clock pulses and said direction signal and responsive thereto for varying the propulsion effort of the train in steps of a selected number of cars, one such step for each received clock pulse, increasing or decreasing from a base level the propulsion level of each car included in a step in accordance with the first or second condition of said direction signal,
i. said advance train line register apparatus further responsive to the completion of each cycle of propulsion steps for generating a second clock pulse, and
e. a propulsion train line encoder coupled for receiving said second clock pulses and also said direction signal, and responsive thereto for establishing a new base level of train propulsion effort upon reception of each second clock pulse, increasing or decreasing from the previous base level as said direction signal has a first or a second condition, respectively,
f. said propulsion train line encoder further connected to said velocity brake error means for inhibiting train braking except when the propulsion base is reduced to a zero level from a higher level.

5. A station stop system for rapid transit trains, each car of a train having individual propulsion control and braking control apparatus, comprising in combination,
a. a register means on the train responsive to passage by an actuating device along the track wayside, marking a preselected distance in approach to the station stop position, for actuating a station stop procedure and registering said preselected distance.
b. a train speed measuring means connected for generating a signal representing actual train speed,
i. said speed measuring means also operable for generating a signal representing actual train acceleration/deceleration,
ii. said speed measuring means also generating a series of pulses each representing a preselected unit of distance traveled,
c. a deceleration computer means coupled for receiving said actual speed signal and said successive distance pulses and controlled by said register means for computing a signal representing the deceleration rate required to stop the train at the station in accordance with existing speed and distance-to-go conditions,
d. a source of a desired deceleration signal to provide maximum passenger comfort,
e. a first comparator means coupled for comparing said required deceleration signal with a predetermined percentage of said desired deceleration signal and connected for driving each car propulsion control apparatus to its lowest propulsion condition when the compared signals are equal, and
f. a second comparator means coupled for comparing said required and desired deceleration signals and further coupled for applying the difference between said actual and required deceleration signals to control said braking control means to stop the train at said station.

6. A station stop system as defined in claim 5, in which,
a. subsequent actuating devices are positioned along the track wayside, each a different lesser preselected distance in approach to said station stop position, and
b. said register means is responsive to passage by each subsequent actuating device for reactuating the station stop procedure and for registering each lesser preselected distance to the station stop,
c. said register means further controlling said deceleration computer means to rescale the actual train speed signal and said distance pulses used to compute required deceleration in accordance with each registered lesser distance.

7. A station stop system as defined in claim 6, in which three wayside actuating devices are positioned in spaced succession along the track in approach to the station stop position.

* * * * *